US012013766B2

(12) United States Patent
Garza et al.

(10) Patent No.: US 12,013,766 B2
(45) Date of Patent: Jun. 18, 2024

(54) LOG RECOVERY FOR INTER-TABLESPACE TABLE MIGRATION

(71) Applicant: BMC Software, Inc., Houston, TX (US)

(72) Inventors: Oscar J. Garza, Helotes, TX (US); Kenneth J. Durfee, Round Rock, TX (US); Mohamad A. Elhage, Austin, TX (US)

(73) Assignee: BMC Software, Inc., Houston, TX (US)

( * ) Notice: Subject to any disclaimer, the term of this patent is extended or adjusted under 35 U.S.C. 154(b) by 100 days.

(21) Appl. No.: 17/657,618

(22) Filed: Mar. 31, 2022

(65) Prior Publication Data

US 2023/0315585 A1     Oct. 5, 2023

(51) Int. Cl.
| | |
|---|---|
| G06F 16/00 | (2019.01) |
| G06F 11/14 | (2006.01) |
| G06F 11/30 | (2006.01) |
| G06F 16/22 | (2019.01) |
| G06F 16/23 | (2019.01) |

(52) U.S. Cl.
CPC ...... *G06F 11/1469* (2013.01); *G06F 11/1435* (2013.01); *G06F 11/1448* (2013.01); *G06F 11/1458* (2013.01); *G06F 11/1471* (2013.01); *G06F 11/3075* (2013.01);
(Continued)

(58) Field of Classification Search
None
See application file for complete search history.

(56) References Cited

U.S. PATENT DOCUMENTS 6,985,901 B1 * 1/2006 Sachse ............... H04L 41/5032
                                                  709/224
8,296,271 B1 * 10/2012 Richardson ......... G06F 11/1469
                                                  707/674
(Continued)

OTHER PUBLICATIONS

IBM, "DB2 10.5 for Linux, UNIX, and Windows: Admin_Move_Table procedure—Move tables online," available online at <https://www.ibm.com/docs/en/db2/10.5?topic=procedure-admin-move-table-move-tables-online>, Mar. 1, 2021, 31 pages.
(Continued)

*Primary Examiner* — Farhan M Syed
(74) *Attorney, Agent, or Firm* — Brake Hughes Bellermann LLP

(57) ABSTRACT

Described systems and techniques enable log recovery that spans inter-tablespace movement of one or more tables within a database. Log-related processing, including, e.g., system recovery, auditing, or reporting, may be maintained, even when such inter-tablespace table movements occur within a time window defined for the log-related processing. A table movement of a moved table from a source tablespace to a target tablespace within a database may be identified. Within a plurality of log records of the database, pre-move log records identifying the moved table as being included within the source tablespace may be identified, and post-move log records identifying the moved table as being included within the target tablespace may be identified. The pre-move log records may be updated to obtain updated pre-move log records identifying the moved table as being included within the target tablespace.

14 Claims, 4 Drawing Sheets

(52) U.S. Cl.
CPC ...... *G06F 11/3086* (2013.01); *G06F 16/2282* (2019.01); *G06F 16/2358* (2019.01)

(56) References Cited

U.S. PATENT DOCUMENTS

| | | | |
|---|---|---|---|
| 9,767,177 B1 * | 9/2017 | Richardson | G06F 16/27 |
| 11,269,925 B2 * | 3/2022 | Martin | G06F 16/2379 |
| 2020/0364240 A1 * | 11/2020 | Martin | G06F 16/273 |

OTHER PUBLICATIONS

IBM, "Db2 for z/OS: Accessing historical data from moved tables by using image copies," available online at <https://www.ibm.com/docs/en/db2-for-zos/12?topic=buryd-accessing-historical-data-from-moved-tables-by-using-image-copies>, Mar. 30, 2022, 5 pages.

IBM, "Db2 for z/OS: Alter Tablespace," available online at <https://www.ibm.com/docs/en/db2-for-zos/12?topic=statements-alter-tablespace>, Mar. 30, 2022, 33 pages.

IBM, "Db2 for z/OS: Moving tables from multi-table table spaces to partition-by-growth table spaces," available online at <https://www.ibm.com/docs/en/db2-for-zos/12?topic=ats-moving-tables-from-multi-table-table-spaces-partition-by-growth-table-spaces>, Mar. 30, 2022, 9 pages.

* cited by examiner

ABSTRACT CONTINUED…

LOG RECOVERY FOR INTER-TABLESPACE TABLE MIGRATION

TECHNICAL FIELD

This description relates to database management.

BACKGROUND

Database technology enables storage, analysis, and retrieval of vast amounts of data. For example, database servers, database management systems, and database languages may be used to store records in a structured manner, insert or delete records, and query available records to retrieve desired information.

Many different types of computer software applications (applications) may utilize and benefit from such database technology. For example, applications across many different industries, such as ecommerce, finance (e.g., banking), network security, telecommunications, oil and gas, energy, government, education, manufacturing, or healthcare may all detect, generate, and/or store vast amounts of data particular to the context (e.g., industry) of each application.

Database systems may utilize logs to ensure that such data (and records of operations performed with respect to the data) will be preserved, even in the event of a system crash. Logs may also be used to audit data, or to generate various other types of reports characterizing the data.

SUMMARY

According to one general aspect, a computer program product may be tangibly embodied on a non-transitory computer-readable storage medium and may include instructions. When executed by at least one computing device, the instructions may be configured to cause the at least one computing device to identify a table movement of a moved table from a source tablespace to a target tablespace within a database system. The instructions, when executed, may be further configured to cause the at least one computing device to identify, within a plurality of log records of the database system, pre-move log records logged prior to the table movement and identifying the moved table as being included within the source tablespace, and post-move log records logged after the table movement and identifying the moved table as being included within the target tablespace. The instructions, when executed, may be further configured to cause the at least one computing device to update the pre-move log records to obtain updated pre-move log records identifying the moved table as being included within the target tablespace.

According to other general aspects, a computer-implemented method may perform the instructions of the computer program product. According to other general aspects, a system, such as a mainframe system or a distributed server system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
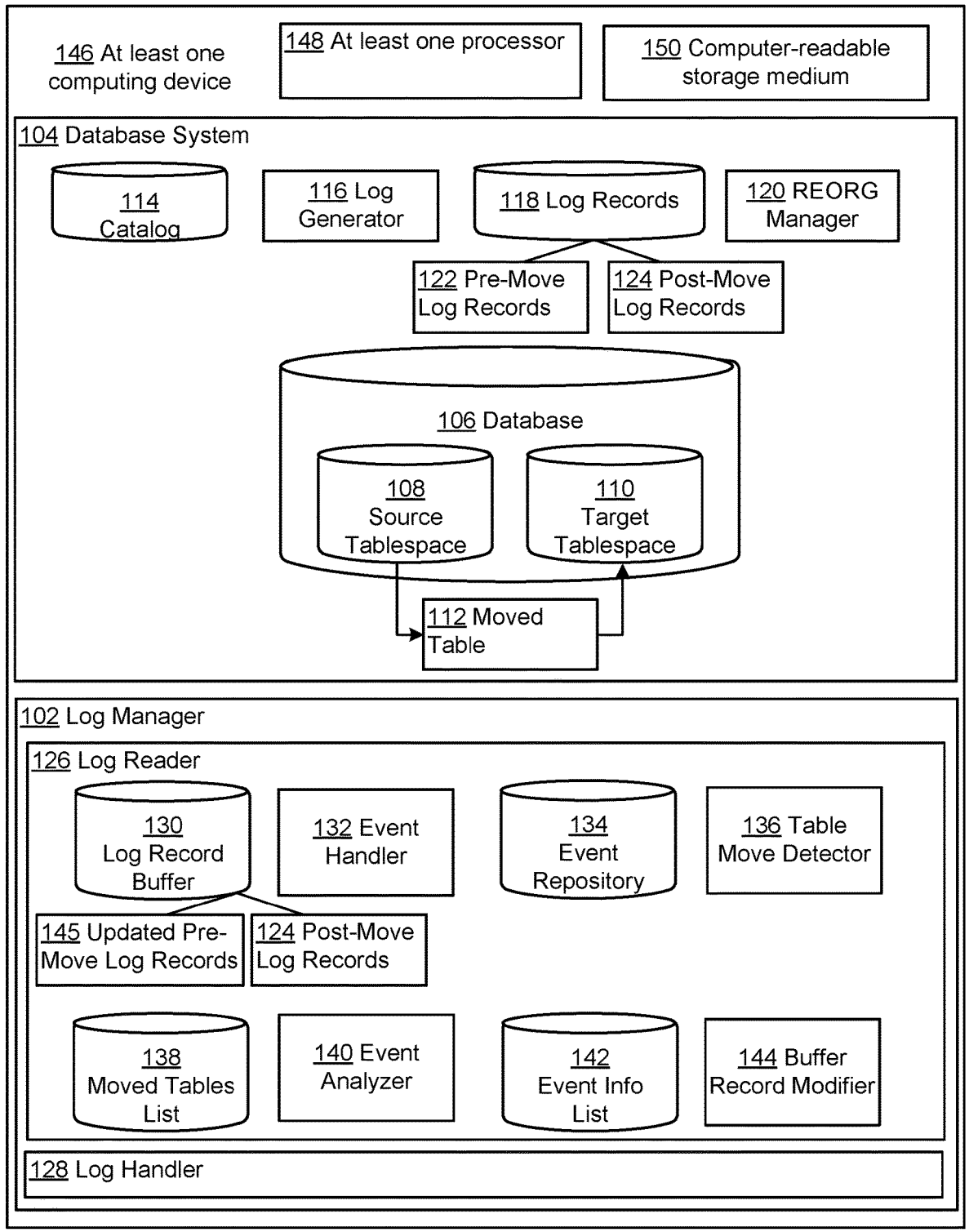
FIG. 1 is a block diagram of a system for log recovery following an inter-tablespace table migration.

Described systems and techniques enable log recovery that spans inter-tablespace movement of one or more tables within a database system. Accordingly, log-related processing, including, e.g., system recovery, auditing, or reporting, may be maintained, even when such inter-tablespace table movements occur within a time window defined for the log-related processing.

A database may include multiple tablespaces, each of which may include one or more tables. During normal operations of a database system, many of the database tables may be updated. For example, various applications may use the database tables, so that execution of jobs or tasks of the applications may result in inserts, deletes, or updates with respect to related tables.

Any such changes to tables may be captured by various types of logging systems, in corresponding log records. For example, a log record may include an activity type of an associated table change (e.g., insert, update, or delete), before and after images of rows/columns, and various other types of relevant data. For example, log records may include identifiers for relevant tables, tablespaces, and databases.

Log records may also include information for identifying a time and/or sequence of the log records. Such information may be used to access desired log records, and/or to determine when a particular logged event occurred. For example, each log record may be assigned a timestamp. For example, each log record may be provided with a memory address. In specific examples, log records may each be assigned a log order value. For example, a relative byte address (RBA), which is an address expressed as a number of bytes from a referenced point to a desired address, may be used with respect to a single or stand-alone subsystem of a database system. When multiple subsystems of a database system are used, a log record sequence number also known as LRSN (which may be generated based on a timestamp) may be used to enable ordering of log records from multiple subsystems, and across the different subsystems.

Accordingly, as a result of normal logging operations, users are provided with an ability to identify and retrieve desired log records, often specified (directly or indirectly) with respect to a particular time window. For example, a report may be generated with respect to log records spanning a time window of midnight to 2:00 AM, or any desired time window.

Reports generated or other uses of log records may otherwise be defined with respect to many other parameters. For example, log records may be specified with respect to one or more specific machines (e.g., servers) and/or one or more specific applications.

In many such cases, as referenced above, log records may include or specify a database table for which changes were performed, e.g., by an accessing application. Such a table may be included within a corresponding tablespace that may itself be included within a specific database. Consequently, the corresponding tablespace and database may also be identified within the same log record(s).

Database systems may provide an ability to move a table from a source tablespace (having a source tablespace) to a target tablespace (having a target tablespace ID), as described in more detailed examples, below. When such inter-tablespace table movement occurs, however, conventional log and/or log-related operations may be disrupted.

For example, when a table is moved from a source tablespace to a target tablespace in conventional systems, the moved table is effectively provided with a new ID for purposes of identification and retrieval. For example, prior to inter-tablespace table movement, the moved table may be identified in a hierarchical naming scheme that reflects the hierarchical database structure, such as: database ID/source tablespace ID/table ID. When the table is moved to the target tablespace, the table may be identified as database ID/target tablespace ID/table ID. Consequently, in conventional systems, any attempt to retrieve the table using "database ID/source tablespace ID/table ID" would capture only pre-move log records obtained while the moved table was stored within the source tablespace, while any attempt to retrieve the table using "database ID/target tablespace ID/table ID" would capture only post-move log records obtained while the moved table was stored within the target tablespace.

It may be possible to obtain desired log information that spans an inter-tablespace table movement by accessing log records twice, with one access performed for pre-move log records including "database ID/source tablespace ID/table ID," and a separate access performed for post-move log records including "database ID/target tablespace ID/table ID." However, such an approach is resource-intensive and error-prone, particularly given that database systems may include large numbers of tables, any of which may be accessed by a potentially large number of applications.

Accordingly, as described in detail herein, described systems and techniques are provided that identify moved tables as having been moved from a source tablespace to a target tablespace. IDs for the pre-move tables within pre-move log records may then be updated and changed to match IDs for the post-move tables within post-move log records.

For example, in the above examples, a pre-move log record with a table having an ID "database ID/source tablespace ID/table ID" may have the ID changed to "database ID/target tablespace ID/table ID," notwithstanding that the updated ID was not the ID actually used and assigned at the time of its capture within the pre-move log records. In this way, for example, when a report is run over a time window that spans an inter-tablespace table movement for all log records with the ID "database ID/target tablespace ID/table ID", the report results will also include relevant pre-move log records in which the ID for the table in question has been updated in the manner just described. As a result, users may easily access log records in a desired manner, even when the desired log records span an inter-tablespace table movement.

FIG. 1 is a block diagram of a system for log recovery following an inter-tablespace table migration. In the example of FIG. 1, a log manager 102 is configured to optimize and enhance logging operations of a database system 104.

For example, the database system 104 may include a plurality of databases, represented in FIG. 1 by a single database 106 for the sake of brevity. The database 106 includes a plurality of tablespaces, represented in FIG. 1 as a source tablespace 108 and a target tablespace 110. Each tablespace provides information relating a physical storage layer (e.g., at a disk level) to a logical storage layer (e.g., tables or indexes). In some implementations, the target tablespace 110 may initially be empty.

Thus, each tablespace 108, 110 may be understood to contain one or more tables. The database system 104 may provide one or more options for moving a table between the tablespaces 108, 110, referred to herein as inter-tablespace table migration, or inter-tablespace table movement. In FIG. 1, a moved table 112 illustrates an example of such inter-tablespace table movement. As noted above, the target tablespace 110 may be empty, so that the moved table 112 may represent the first and/or only table included in the target tablespace 110.

The database system 104 may represent many different types of database systems. For example, the database system 104 may include or represent a database management system also known as DBMSand the database 106 may include a relational database. The database system 104 may provide various related functionalities, such as user interfaces, user profile administration, security, resiliency, and various other logistical aspects of data management. For example, the database system 104 may represent the Db2® system of IBM.

Further specific features and aspects of the database system 104 are not described in detail, except as may be necessary or helpful to understand operations of the log manager 102. For example, the database system 104 may include a catalog 114, which may represent capture and storage of many different types of data that may be useful for operations of the database system 104, including for management of the database 106.

For example, as described in more detail, below, the catalog 114 may include various types of data or metadata characterizing any of the database 106, the source tablespace 108, the target tablespace 110, or the moved table 112, or operations related thereto. That is, as the database 106, the source tablespace 108, the target tablespace 110, and the moved table 112 all are singular examples representing corresponding pluralities of database-related elements, it will be appreciated that the catalog 114 may capture and store large quantities of information related to, e.g., all databases, tablespaces, and tables of the database system 104.

In particular examples, the catalog 114 may include one or more recovery tables designed to specify information that may be needed for recovery operations in the event of a system crash. For example, some data of the database 106 may be compressed when stored, and the catalog 114 may specify locations at which one or more decompression dictionaries needed to decompress the compressed data is/are stored, for access and use in a recovery context. For example, compression/decompression dictionaries may be stored in image copies, within corresponding tablespaces, or in various backup copies (including, e.g., within log records 118, as described below).

Although not separately illustrated in FIG. 1, the database system 104 may be understood to support operations of one or more applications, which may be used, for example, for ecommerce, finance (e.g., banking), network security, telecommunications, oil and gas, energy, manufacturing, for various entities such as business, government, education, or healthcare entities. Such applications may thus, for example, provide core functions of those entities, such as executing transactions with customers of those entities or other users of the applications (e.g., employees), producing goods for sale, or maintaining patient histories. Accordingly, the database system 104 may be used, for example, to support or enable individual customer transactions, telecommunication services, oil and gas or energy or manufacturing production units, manufacturing operations, student education records, government records, patient histories, or any related hardware or software operations.

In example implementations, such transactions may occur in an inherent order, e.g., may be inherently sequential, such as when the transactions reflect or memorialize ordered or sequential operations. For example, as referenced, many businesses and other entities generate data that reflects, or results from, ongoing operations.

In these and similar contexts, a log generator 116 may be used to provide many different types of data logging, which generally refers to the capture, collection, and storage of data over time, as associated events occur with respect to underlying hardware and software components and information technology (IT) operations. For example, the log generator 116 may include a plurality of log records 118 characterizing transactions performed with respect to the database 106, such as updates, entries, or deletions of data within database tables, including the moved table 112. More generally, data logging may refer to capturing, in an automated manner, operations of hardware and software components for which the data logging is performed, to enable identification, analysis, and correction of system malfunctions, including restart or recovery operations.

Thus, each log record of the log records 118 may be understood to include any specified information that may be useful in the above-described endeavors, or related endeavors. For example, each log record of the log records 118 may include checkpoint data, such as activity type (e.g., insert, update, or delete) and image copies of specific tables (and rows and columns thereof).

As referenced above, each log record may also include a timestamp or other indicator of order or sequence, such as the RBA already mentioned. In particular examples, such address information (e.g., RBA) may be incremented for each byte added to the log records 118, as the corresponding byte is added. In this way, the RBA reflects a relative timing of such additions.

A reorganization (REORG) manager 120 may be used to manage and implement various operations and optimizations of the database system 104, e.g., with respect to the database 106. For example, as described in detail, below, the REORG manager 120 may be involved in implementing the movement of the moved table 112 from the source tablespace 108 to the target tablespace 110.

For example, the REORG manager 120 or other operation of the database system 104 may execute a move or migration of the moved table 112 from the source tablespace 108 to the target tablespace 110 at a point or period in time, referred to herein as a movement time. Consequently, as the log records 118 are continually logged by the log generator 116, the log records 118 will span the movement time, resulting in inclusion of pre-move log records 122 and post-move log records 124.

The log manager 102, as referenced above, may represent and include various components for analyzing and otherwise leveraging the log records 118. For example, as described an illustrated, the database system 104 may be configured to generate the log records 118, using the data from the log generator 116.

The log manager 102 may be implemented externally to, but in communication with, the database system 104. By accessing the log records 118, the catalog 114, and/or the database 106, the log manager 102 may provide additional features and functions with respect to the log records 118, which may not otherwise be natively available when using the database system 104.

For example, the log manager 102 may enable optimization of various database system functions, including support for extending all operations of the database system 104, including support for operations of the REORG manager 120, as described below. The log manager 102 may also enable specific types of reporting on (e.g., auditing of) transaction data. The log manager 102 may provide these and other log-related functions in a highly customizable, intuitive manner.

For example, the log manager 102 may include a log reader 126 and a log handler 128. As described in detail, below, the log reader 126 may be configured to obtain required or desired data from the database system 104, including, e.g., data from the log records 118 and the catalog 114. Then, the log handler 128 may be configured to process the obtained log data in various desired fashions, as referenced above or as otherwise known.

In more detail, the log reader 126 may include a log record buffer 130. The log record buffer 130 may be configured to store individual log records obtained from the log records 118. Whereas the log records 118 may be internal to the database system 104 and restricted from being changed by the log reader 126, buffered log records in the log record buffer 130 may be modified as needed by the log reader 126, as described in detail, below.

The log reader 126 may also include an event handler 132. The event handler 132 may be configured to determine event data related to events stored in the catalog 114, and to then store the resulting event data within an event repository 134. In this context, events and related event data refer to data or metadata associated with specific events that occur in the context of the database system 104, that are not captured (or not completely captured) in the log records 118.

For example, such events may occur with respect to one or more databases, tablespaces, or tables of the database system 104. For example, an event may be characterized with respect to a plurality of databases, tablespaces, or tables of the database system 104.

For example, the REORG manager 120 may execute a reorganization event that involves a plurality of tablespaces, including the source tablespace 108 and the target tablespace 110. Resulting REORG event data may be captured within an appropriate table of the catalog 114. That is, although the log generator 116 may generate log records of the log records 118 that are related to the REORG event, there may be other REORG event data that is not captured or preserved in a logging context, but that may be desired at a later time.

For example, as referenced above, a tablespace may be associated with data or metadata related to use of the tablespace, such as compression/decompression data. Therefore, addition, modification, or deletion of such compression/decompression data may represent an event and may represent related event data of the catalog 114. For example, although the log records 118 may include log data related to a specific compression operation performed on a tablespace at a point in time, the catalog 114 may store a corresponding compression/decompression dictionary or library used in the specific compression operation, which may be used in the context of many different compression operations over a period of time.

In FIG. 1, the event handler 132 may be configured to access the catalog 114 to obtain desired event data, which may be stored in an event repository 134. In some cases, the event handler 132 may capture desired event data on an as-needed basis. Additionally, or alternatively, the event handler 132 may capture event data to store in the event repository 134 in anticipation of potential future use of such event data, i.e., when there is not an immediate need for such event data. Accordingly, the event repository 134 may include event data that may be leveraged by the log reader 126 if and when such a need arises.

For example, some event data may be deleted from the catalog 114 as part of normal operations of the database system 104, e.g., in conjunction with a corresponding event. By capturing such event data using the event handler 132 in an ongoing manner, before a specific need for such event data arises, the log reader 126 is provided with event data that might otherwise be unavailable at a time it is needed for desired processing and preserves it for future use when needed.

In a specific example, described in more detail below, deletion of the source tablespace 108 may occur, such as when a user intentionally or unintentionally drops the source tablespace 108 (e.g., after or in conjunction with the execution of a reorganization event by the REORG manager 120 that affects movement of the moved table 112). Such actions may be logged, resulting in log records corresponding to what was dropped. Moreover, in conjunction with such execution event, compression/decompression definitions or libraries of the catalog 114 that are associated with the source tablespace 108 may also be deleted. Nonetheless, if the event handler 132 captures such compression/decompression definitions or libraries from the catalog 114 on a regular basis, or in conjunction with the specific event (such as the deletion event of the source tablespace 108), then the compression/decompression definitions or libraries of the catalog 114 may be stored in the event repository 134 and may thus be available for later use.

As the event handler 132 may be configured to access the catalog 114 to obtain event data of the event repository 134, a table move detector 136 may be configured to query the catalog 114 to obtain a moved tables list 138, including the moved table 112 itself. For example, the catalog 114 may include a cataloging of many different databases, tablespaces, and tables, as well as related event data. The table move detector 136 may be configured to query the catalog 114 and determine that one or more inter-tablespace table moves occurred, identify associated moved tables, and identify a point(s) in time at which each table move occurred. In this way, each moved table, including the moved table 112, may be stored in the moved table list 138 with any associated information, including the point in time at which the corresponding table move occurred.

Then, using the moved tables list 138, an event analyzer 140 may be configured to identify corresponding event data within one or both of the catalog 114 and/or the event repository 134, which relates to the various moved tables. Resulting event data may be stored within an event info list 142. For example, continuing the examples above, the relevant event data may include compression/decompression definitions or libraries of the catalog 114 and/or the event repository 134, which may be relevant to the specific tables of the moved tables list 138 and that may be needed for further processing of the log record buffer 130.

In particular, a buffer record modifier 144 may be configured to access the moved tables list 138 and the event info list 142 to modify specific log records within the log record buffer 130, in a manner that enables seamless handling of log data by the log handler 128, even when the log data being processed spans an inter-tablespace table move. For example, the log record buffer 130 may contain buffered versions of pre-move log records 122 and post-move log records 124. Then, the buffer record modifier 144 may be configured to modify identifying information of the pre-move log records 122 within the log record buffer 130 to match identifying information of the post-move log records 124.

For example, in the pre-move log records 122 within the log record buffer 130, the buffer record modifier 144 may change a source tablespace ID identifying the source tablespace 108 to a target tablespace ID identifying the target tablespace 110, to obtain updated pre-move log records 145. In this way, the pre-move log records 122 in the log record buffer 130 may be updated to reflect a result of the table movement of the moved table 112, even though the pre-move log records 122 actually identified the source tablespace 108 prior to the table movement occurring.

Consequently, at a subsequent time, the log handler 128 may accurately and easily process buffered log records from the log record buffer 130 that span a movement time at which the moved table 112 was moved between tablespaces 108 110. Specifically, for example, the log handler 128 may simply use identifying information of the target tablespace 110 to retrieve both the updated pre-move log records 145 and the buffered post-move log records 124 from the log record buffer 130, as shown in FIG. 1.

Then, both the updated pre-move log records 145 and the post-move log records 124 may be retrieved from the log record buffer 130 by the log handler 128 for a desired time window. Moreover, the log handler 128 may be provided with any event data from the event info list 142 that may be needed to execute desired log handling processes, even for the updated pre-moved log records 145 from the log record buffer 130.

For example, as described in detail, below, the log handler 128 may be configured to execute ongoing log scan processes with minimal or no interruption. Related jobs may be executed in accordance with production schedules that are critical for users of the database system 104. By modifying the log record buffer 130 as described herein, and by making the event info list 142 available, such jobs may continue without interruption. For example, the log handler 128 may simply proceed as though the moved table 112 were stored using the target tablespace 110 throughout an entirety of a relevant time window, even though the moved table 112 was actually located within the source tablespace 108 for at least a portion of the relevant time window.

In FIG. 1, the database system 104 should be understood to be executable by any suitable computing platform. For purposes of illustration and example, FIG. 1 shows that the database system 104, as well as the log manager 102, may be executed using at least one computing device 146. The at least one computing device 146 may include at least one processor 148. The at least one computing device 146 is also illustrated as including a non-transitory computer-readable storage medium 150. That is, the non-transitory computer-readable storage medium 150 may store instructions that, when executed by the at least one processor 148, cause the at least one computing device 146 to provide the functionalities of the log manager 102 and the database system 104.

Figure 3:
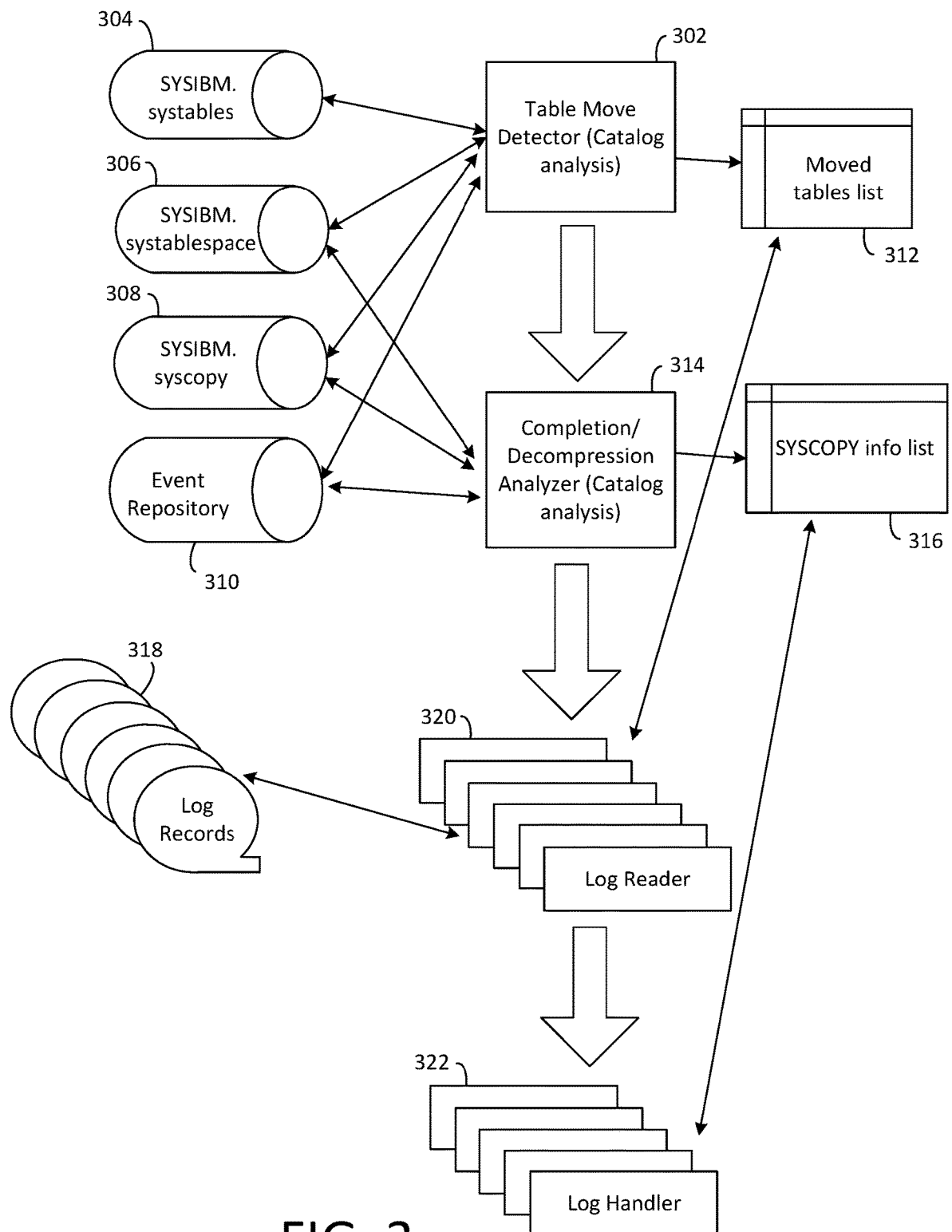
FIG. 3 is a block diagram illustrating a more detailed example implementation of the system of FIG. 1.

For example, the at least one computing device 146 may represent one or more servers, a mainframe, one or more logical partitions, or one or more virtual machines. For example, the at least one computing device 146 may be implemented as two or more computing devices in communications with one another over a network. Accordingly, the log manager 102 (or individual components, modules, or portions thereof) may be implemented using separate devices in communication with one another, as well. For example, although the log reader 126 is illustrated in FIG. 1 as a singular module that includes the various components or submodules 130-144, it will be appreciated that some of the components or submodules 130-144 may be implemented externally to, but in communication with, the log reader 126, as shown in the example of FIG. 3, below.

In specific examples, the at least one computing device 146 may be implemented in the context of a mainframe computing system. In such examples, as referenced above and described in more detail, below, the database system 104 may include Db2 from IBM. In other examples, however, the at least one computing device 146 need not represent a mainframe system, and the database system 104 may represent any suitable database system.

Figure 2:
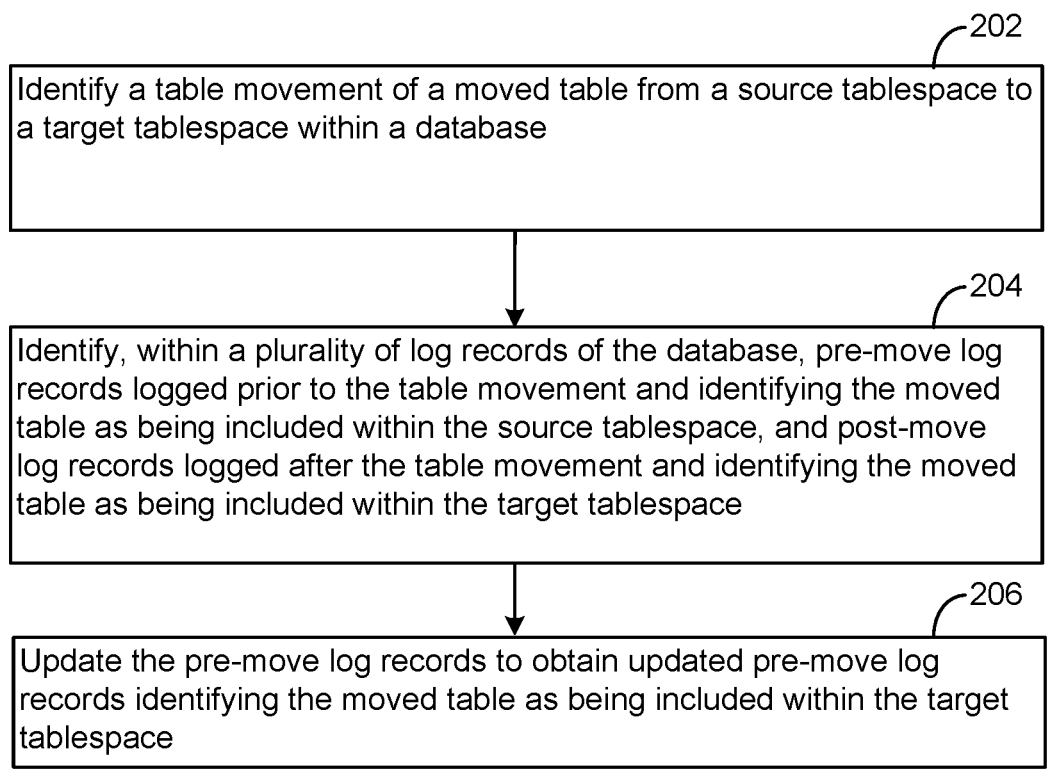
FIG. 2 is a flowchart illustrating example operations of the system of FIG. 1.

FIG. 2 is a flowchart illustrating example operations of the system of FIG. 1. In the example of FIG. 2, operations 202-206 are illustrated as separate, sequential operations. In various implementations, the operations 202-206 may include sub-operations, may be performed in a different order, may include alternative or additional operations, or may omit one or more operations. Further, in all such implementations, included operations may be performed in an iterative, looped, nested, or branched fashion.

In the example of FIG. 2, a table movement of a moved table from a source tablespace to a target tablespace within a database may be identified (202). For example, the table move detector 136 of FIG. 1 may be configured to query the catalog 114 of the database system 104 to identify the moved tables list 138. The table move detector 136 may be configured to determine the moved tables list 138 at periodic intervals, or in response to an event cataloged by the catalog 114, or in response to a log handling request from the log handler 128 (e.g., a request for an audit or other report).

Within a plurality of log records of the database, pre-move log records logged prior to the table movement and identifying the moved table as being included within the source tablespace may be identified, and post-move log records logged after the table movement and identifying the moved table as being included within the target tablespace may be identified (204). For example, the log record buffer 130 may be configured to buffer and store the log records 118, including the pre-move log records 122 and the post-move log records 124, as the log records 118 are logged by the log generator 116 or at any specified buffering interval. Then, the table move detector 136 may determine a relevant time window, during which the table movement time occurred.

Having identified the moved tables list 138, the table move detector 136 may be configured to identify the pre-move log records 122 within the log record buffer 130, including determining that the pre-move log records 122 are identified using a combination of a database ID of the database 106, a source tablespace ID of the source tablespace 108, and a table ID of the moved table 112 itself. Similarly, the table move detector 136 may be configured to determine that the post-move log records 124 are identified using a combination of the database ID, a target tablespace ID of the target tablespace 110, and the table ID.

The pre-move log records may be updated to obtain updated pre-move log records identifying the moved table as being included within the target tablespace (206). For example, the buffer record modifier 144 may be configured to update the pre-move log records 122 within the log record buffer 130 so that the pre-move log records 122 are updated to be identified using a combination of the database ID, the target tablespace ID, and the table ID.

Accordingly, as described herein, when the log handler 128 proceeds with executing a job that includes processing log records spanning the table movement time, the log handler 128 may obtain all relevant buffered log records, including the buffered updated pre-move log records 145 and the buffered post-move log records 124, using the combined ID that includes the database ID, target tablespace ID, and the table ID. When processing the updated pre-move log records 145, the log handler 128 may utilize the event info list 142 if needed to use event data related to the source tablespace 108 to process the updated pre-move log records 145. For example, as a result of the updated pre-move log records 145 being originally located within, and processed in the context of, the source tablespace 108, the event info list 142 may include compression/decompression dictionaries and/or libraries of the source tablespace 108 needed by the log handler 128 to process the updated pre-move log records 145.

Figure 4:
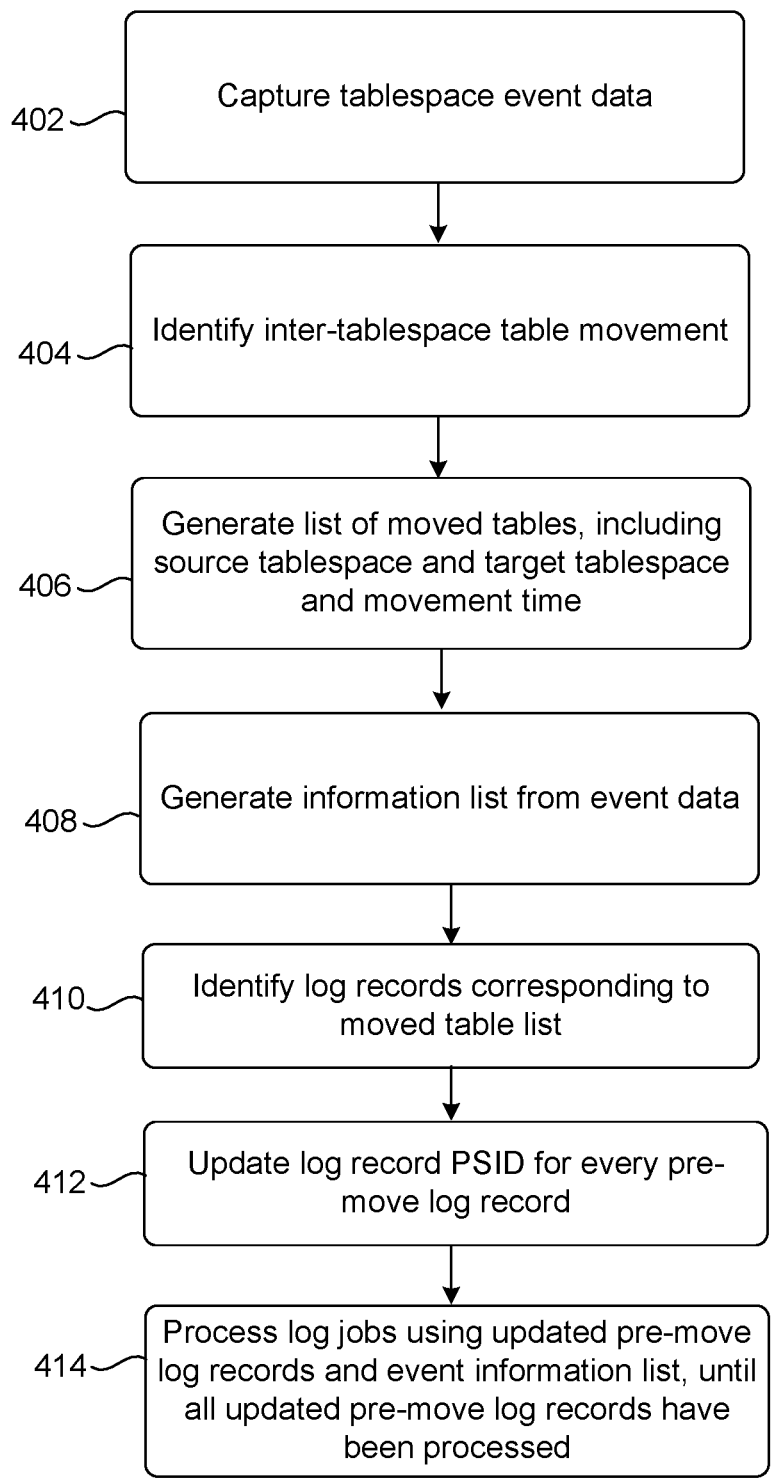
FIG. 4 is a flowchart illustrating detailed example operations of the system of FIG. 3.

FIG. 3 is a block diagram illustrating a more detailed example implementation of the system of FIG. 1. FIG. 4 is a flowchart illustrating detailed example operations of the system of FIG. 3. In the example of FIGS. 3 and 4, the database system 104 may be implemented using the Db2 system of IBM, so that specific examples of components of the database system 104 of FIG. 1 are provided below using Db2 examples and nomenclature.

In FIG. 3, a table move detector 302, as an example implementation of the table move detector 136 of FIG. 1, may be configured to interface with a plurality of components or portions of a database system catalog, analogous to the catalog 114 of FIG. 1. Such catalog components in FIG. 3 includes SYSIBM.systables 304, SYSIBM.systablespace 306, and SYSIBM.syscopy 308. By interacting with these catalog components 304, 306, 308, the table move detector 302 is configured to generate a moved tables list 312, similar to the moved tables list 138 of FIG. 1.

In more detail, in the example of FIG. 3, SYSIBM refers to a specific schema used for catalog storage in Db2, used in SYSIBM.systables 304 to store table data and in SYSIBM.systablespace 306 to store tablespace data. Further in FIG. 3, syscopy refers to a type of recovery table in Db2.

For example, SYSIBM.syscopy 308 may identify event information (e.g., may identify where such event information is stored) that may be useful in the types of table movement analysis described herein. For example, during normal use of the database system 104, if a tablespace is changed in a manner that may have an influence on a recovery to be performed later, such change(s) may be identified as recovery event information in SYSIBM.syscopy 308. For example, the SYSIBM.syscopy 308 may identify a recording/storage location including any image copy or log record at which the execution of a reorganization event by the REORG manager 120, load(s), or recover event(s) may be recorded.

However, as referenced above in the context of FIG. 1, the SYSIBM.syscopy 308 may not store references to all such event data for a sufficiently long period of time. For example, SYSIBM.syscopy 308 may simply be configured to delete certain types or quantities of such reference data after a defined period of time. In other examples, as also referenced above, SYSIBM.syscopy 308 may delete certain types of reference information in response to other events within the database system 104. For example, when a tablespace (such as the source tablespace 108) is deleted, re-written with other data, or otherwise dropped, SYSIBM.syscopy 308 may also automatically delete, re-write other data, or otherwise drop reference to corresponding event data related to the deleted or dropped tablespace (e.g., identification of decompression-related information that may be needed to decompress stored table data).

Accordingly, an event repository 310 may be used to capture information that might be deleted from SYSIBM.syscopy 308, while still having a potential to be used later by various techniques described herein. For example, the event repository 310, analogous to the event repository 134 of FIG. 1, may capture decompression information originally stored in, but deleted from, SYSIBM.syscopy 308.

In other words, the event repository 310 may be populated in an ongoing manner, with information that may (or may not) be needed for future operations. In this way, information stored therein (e.g., decompression information) may be available if needed at a later time and no longer available in SYSIBM.syscopy 308.

Accordingly, the table move detector 302 may first determine that a table movement has occurred, e.g., by searching SYSIBM.syscopy 308 for the execution of a reorganization event by the REORG manager 120 that included a table movement. Then, the table move detector 302 may query the SYSIBM.systables 304 and the SYSIBM.systablespace 306 to generate a list of moved tables, shown in FIG. 3 as moved tables list 312.

Further in FIG. 3, and as described above, any log records that have been processed as part of the logging process may require additional event data to be used. In the above examples, compression/decompression was discussed as an example of such processing. In other examples, table-related data may be stored in a delta format, such as when only a changed portion of a table row is logged. Then, when that data is used from log records, one or more rows may require completion processing to complete an entire table row, including the non-changed portions.

As with compression/decompression data, such completion data may be stored in SYSIBM.syscopy 308. Also, as with compression/decompression data, such completion data may be deleted prematurely from SYSIBM.syscopy 308 (e.g., for purposes of the log manager 102 of FIG. 1) and may therefore be captured and stored within the event repository 310.

Accordingly, a completion/decompression analyzer 314 may perform analysis of SYSIBM.syscopy 308 as well as the event repository 310, in order to generate a syscopy info list 316. That is, the syscopy info list 316 illustrates an example of the event info list 142 of FIG. 1, in the context of FIG. 3. The syscopy info list 316 thus includes all needed event information required to use pre-move log records, e.g., to perform row completion of table rows of log records 318 and/or to perform for example, decompression of log records 318.

Accordingly log reader(s) 320 may access log records 318, representing examples of the log records 118 of FIG. 1. As also shown in FIG. 1, the log reader 320 may include, or have access to, a log record buffer in which various pre-move log records, corresponding to the moved tables list 312, may be stored.

Thus, the log reader 320 may proceed to update the buffered, pre-move log records, to obtain updated pre-move log records, similar to the updated pre-move log records 145 of FIG. 1. Then, log handler 322 may process all buffered log records, including updated pre-move log records 145 as well as post-move log records 124, as part of a single job. For example, as shown, the log handler 322 may access the syscopy info list 316 to obtain any information needed to complete, decompress, or otherwise access the buffered log records.

As a result, the log handler 322 (or the log handler 128 of FIG. 1) may be configured to make log records affected by a table movement available for processing. For example, the log handler 322 is provided with an ability to execute ongoing log scan processes without interruption. As such jobs may reside on production schedules, users would otherwise be likely to experience outages and/or be required to modify production schedules. As described, such difficulties may be avoided by modifying buffered, pre-move log records to mimic or reflect post-move log records for the same tables.

FIG. 4 is a flowchart illustrating example implementations of FIG. 3 (or of FIG. 1), in specific example Db2 contexts. In the following examples, by way of nomenclature, a database ID is referred to as a DBID, a tablespace ID is referred to as a PSID, and a table ID is referred to as an OBID. As a result and considering the hierarchical nature of the database/tablespace/table architecture, a particular table may be identified as having a particular, unique DBID/PSID/OBID name.

In the example of FIG. 4, the system of FIG. 3 may be implemented in the context of table movements between multi-table tablespaces and single-table tablespaces. For example, historical tablespaces, such as the source tablespace 108 of FIG. 1, may be used to store one, two, or more tables, and each table may be of one or more format(s) and/or type(s). For example, tablespaces may have various types of partitioning schemes. Tablespaces with multiple tables may be referred to as multi-table tablespaces.

As a result, code required to deal with all such variations may be more complex and/or consume more time or other resource(s), as compared to using tablespaces that are restricted in terms of a number and/or type of table(s) included therein. Consequently, it may be desirable to move tables among tablespaces and to use fewer variations in terms of table type or table format, in order to obtain a simplified distribution of tablespaces and included tables, and a corresponding simplification in the code that processes such tables. For example, tablespaces may be restricted to containing only a single table each, which may be referred to as a single-table tablespace, or, when eventual system-wide migration to such a scheme is intended or required, may be referred to as a universal tablespace. Within such a universal tablespace, table types and/or formats may also be restricted for further simplifications, e.g., by using only a partition by growth or partition by range scheme(s).

Thus, in specific examples, Db2 production sites may be actively migrating tables from multi-table tablespaces to partition-by-growth universal tablespaces with only a single table per tablespace. Such migrations may be associated with near real-time, continuous data migration of log activity before and after the move-table event, auditing of data that occurred before and after the move-table event, and/or identifying or analyzing problem transactions that occurred before and after the move-table event.

FIG. 4, and the following description, thus illustrates and describes specific examples of seamless processing of log activity before and after a move-table event, without interruption or intervention. In such examples, there may be no need to stop the processing of ongoing jobs of the log handler 322, move the table(s), and restart the ongoing job after the execution of the move-table event, e.g., via a execution of a tablespace reorganization event by the REORG manager 120.

Instead, as described above, for tables that have been moved from a multi-table tablespace to a partition-by-growth universal table space, the log reader(s) 320 will identify log records generated prior to the execution of a tablespace reorganization event by the REORG manager 120. The log reader(s) 320 may then update the PSID stored in each pre-move log record 122 with the current PSID of the new target partition-by-growth universal table space. Normal log processing by the log handler(s) 322 may thus proceed for Db2 activities logged prior to and after the execution of the move-table event.

In more detail, in FIG. 4, tablespace event data is captured (402) during normal operations of a database 104 system catalog 114, e.g., using SYSIBM.syscopy 308, as well as using the event repository 310. That is, as described, such event data may include a complete representation of a history of a tablespace(s) and may be captured on an on-going basis.

An inter-tablespace table movement may be identified (404), and a list of moved tables may be generated, including each source tablespace and target tablespace and movement time (406) at which each table movement occurred. In specific examples of FIG. 4, such information may be determined by performing a Standard Query Language (SQL) query against data stored in the SYSIBM.syscopy 308, the SYSIBM.systables 304, the SYSIBM.systablespace 306, and, if necessary, the event repository 310.

For example, a table move may be implemented in the context of a execution of a tablespace reorganization event by the REORG manager 120, as described with respect to FIG. 1. Such processes may be performed to optimize use of a storage space of the tablespace, and table moves may be incorporated in, and executed as part of, such processes. For example, a tablespace may be associated with a command known as an 'alter tablespace, move table' command used to move a table from one tablespace to another without necessarily having to drop the source tablespace and/or build a new tablespace for the target tablespace, and without having to unload and reload the moved table. Although such table movements are feasible, they may result in outages until the new tablespace(s) are created, loaded, and operational. In contrast, the alter tablespace, move-table command enables a more straightforward movement between table spaces.

In so doing, however, the moved table effectively receives a new unique identifier. For example, a table having a unique ID of the format DBID/PSID/OBID as described above will receive a new PSID as a result of a table move, while the DBID and OBID will remain the same both before and after the table move.

To generate the moved tables list 312, analysis of SYSIBM.syscopy 308 may be performed to identify move-table activity. For example, a suitable SELECT statement may be used to query the SYSIBM.SYSCOPY 308, as shown in Pseudocode 1:

```
SELECT DSNAME
    ,DBNAME
    ,TSNAME
    ,START_RBA
    ,TIMESTAMP
FROM SYSIBM.SYSCOPY
WHERE ICTYPE = 'W' AND STYPE = 'M'
AND DSNAME < > RTRIM(DBNAME) CONCAT '.' CONCAT RTRIM(TSNAME);
```

In Pseudocode 1, a SYSCOPY record with ICTYPE=W and STYPE=M for the source tablespace indicates that the execution of a reorganization event by the REORG manager 120 moved a table from the source tablespace 108 into the target tablespace 110. The DSNAME column contains the name of the target tablespace 110, dbname.tsname. The DBNAME contains the source database 106 name, and the TSNAME contains the source tablespace name 108. The START_RBA (moveTableRba) and the TIMESTAMP (moveTableTs) may be extracted and used to identify a point in time when the move-table command was executed.

In addition to the information queried from SYSIBM.syscopy 308, the DBID and PSID may be queried for both the source table space 108 and target table space 110 from SYSIBM.systablespace 306 with the following SELECT statement (assuming the source tablespace being queried has not previously been deleted or dropped, in which case the event repository 310 may be used), as shown in Pseudocode 2:

```
SELECT DBID, PSID
    FROM SYSIBM.SYSTABLESPACE
    WHERE DBNAME = dbname
    AND NAME  = tsname (source and target table space name)
    AND CREATEDTS < moveTableTs;
```

Then, the OBID and RBA1 (tbCreateRba) may be queried from SYSIBM.systables 304 for the target partition-by-growth universal table space with the following SELECT statement, as shown in Pseudocode 3:

```
SELECT OBID, RBA1
    FROM SYSIBM.SYSTABLES
    WHERE DBNAME = dbname
    AND TSNAME = tsname
    AND TYPE =  'T';
```

An information list, such as the SYSCOPY info list 316, may then be generated as an information list from event data (408) that corresponds to the generated moved tables list 312. For example, as discussed, for partially logged and compressed log records, additional resources may be needed to complete and decompress a row image. For example, tablespace image copies are resources used for both completion and decompression processing. Row images and auto compression dictionaries found in the log are also viable resources, in addition to resources found in the event repository 310.

To obtain these resources, a complete representation of the history of a table space may be obtained from SYSIBM.syscopy 308 and the event repository 310. To gather this information for a table that has been moved, the SYSIBM.syscopy 308 information for both the source tablespace 108 and target tablespace 110 may be selected and combined into a single list (e.g., the syscopy info list 316) that can be used by log handlers 322 when a row image requires completion and/or decompression.

For example, SYSIBM.syscopy 308 rows for both the target tablespace 110 and the source tablespace 108 may be selected. For the target tablespace 110, all relevant SYSIBM.syscopy 308 rows may be selected from SYSIBM.syscopy 308, as shown in Pseudocode 4:

```
SELECT *
    FROM SYSIBM.SYSCOPY
    WHERE DBNAME  = dbname
    AND TSNAME   = targetTsname
    AND OTYPE    = 'T'
    AND START_RBA < toRangeRba
    AND START_RBA >= fromRangeRba;
```

For the source tablespace 108, only relevant SYSIBM.syscopy 308 rows that occurred prior to the move are needed, as shown in Pseudocode 5:

```
SELECT *
    FROM SYSIBM.SYSCOPY
    WHERE DBNAME   = dbname
      AND TSNAME   = sourceTsname
      AND OTYPE    = 'T'
      AND START_RBA < moveTableRba
      AND START_RBA >= fromRangeRba;
```

All selected rows may then be added into the internal syscopy info list 316, which may be used during completion and/or decompression processing. Similar selects may be made against the event repository 310, e.g., to obtain SYSIBM.syscopy 308 entries that have been deleted from SYSIBM.syscopy 308 but that may be required for log processing, as described above.

Then, log records corresponding to the moved table list may be identified (410). A log record PSID may be updated for each pre-move log record (412) to obtain updated pre-move log records.

For example, the log reader(s) 320 and the log handler(s) 322 may be initiated. The log reader 320 may be configured to read and filter the log records in any manner suitable for desired log processing to be implemented. The moved tables list 312 may be used to ensure that both the source and target PSIDs are included when assembling any filtering algorithm. For the selected log records, the DBID, PSID, and OBID may be extracted from the log record to key into the moved tables list 312. The DBID, source PSID, and OBID in the moved tables list 312 may be searched. If a match is found and the logRba is greater than the tbCreatedRba and less than the moveTableRba, then the log record's PSID may be updated to the target PSID, prior to any call to its designated log handler 322 for processing (using, e.g., information from the syscopy info list 316).

Processing of the log jobs may proceed, using the updated pre-move log records and event information list, until all updated pre-move log records have been processed (414). That is, in the example above, once the source PSID is updated to the target PSID for log records that have a logRba that is less than its respective moveTableRba, then normal log processing can continue.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   query a database to retrieve a table movement of a moved table from a source tablespace to a target tablespace within the database, wherein the database has a database identifier (ID) and includes the source tablespace with a source tablespace ID and the target tablespace with a target tablespace ID;

query a log record repository of the database containing a plurality of log records, to thereby obtain from the plurality of log records, pre-move log records logged prior to the table movement and identifying the moved table as being included within the source tablespace, and post-move log records logged after the table movement and identifying the moved table as being included within the target tablespace;

store the pre-move log records and the post-move log records within a log record buffer to obtain stored pre-move log records and stored post-move log records;

identify the moved table within the stored pre-move log records using a combination of the database ID, the source tablespace ID, and a table ID of the moved table; and modify the stored pre-move log records within the log record buffer to obtain updated pre-move log records identifying the moved table as being included within the target tablespace, including changing the source tablespace ID to the target tablespace ID within the stored pre-move log records to thereby obtain the updated pre-move log records.

2. The computer program product of claim 1, wherein the instructions are further configured to cause the at least one computing device to:

query a catalog of the database to identify table movement activity, including a list of moved tables; and identify the table movement from the table movement activity, including identifying the moved table from the list of moved tables.

3. The computer program product of claim 1, wherein the instructions are further configured to cause the at least one computing device to:

distinguish the pre-move log records from the post-move log records by analyzing a log order value of each of the plurality of log records with respect to a movement time at which the table movement occurred.

4. The computer program product of claim 1, wherein the instructions are further configured to cause the at least one computing device to:

identify a reorganization process executed with respect to the database; and identify the table movement as occurring as part of the reorganization process.

5. The computer program product of claim 1, wherein the instructions are further configured to cause the at least one computing device to:

identify the table movement as occurring in response to a command of the database.

6. The computer program product of claim 1, wherein the instructions are further configured to cause the at least one computing device to:

request the updated pre-move log records and the post-move log records using an identification of the target tablespace; and execute processing of the updated pre-move log records and the post-move log records.

7. The computer program product of claim 1, wherein the instructions are further configured to cause the at least one computing device to:

obtain, from a catalog of the database and in response to identifying the table movement, event data related to the source tablespace; and process the updated pre-move log records and the post-move log records, using the event data to process the updated pre-move log records.

8. The computer program product of claim 7, wherein the instructions are further configured to cause the at least one computing device to:

capture the event data prior to the table movement within an event repository that is external to the database.

9. A computer-implemented method, the method comprising:

querying a database to retrieve a table movement of a moved table from a source tablespace to a target tablespace within the database, wherein the database has a database identifier (ID) and includes the source tablespace with a source tablespace ID and the target tablespace with a target tablespace ID;

querying a log record repository of the database containing a plurality of log records, to thereby obtain from the plurality of log records, pre-move log records logged prior to the table movement and identifying the moved table as being included within the source tablespace, and post-move log records logged after the table movement and identifying the moved table as being included within the target tablespace;

storing the pre-move log records and the post-move log records within a log record buffer to obtain stored pre-move log records and stored post-move log records;

identifying the moved table within the stored pre-move log records using a combination of the database ID, the source tablespace ID, and a table ID of the moved table; and modifying the stored pre-move log records within the log record buffer to obtain updated pre-move log records identifying the moved table as being included within the target tablespace, including changing the source tablespace ID to the target tablespace ID within the stored pre-move log records to thereby obtain the updated pre-move log records.

10. The method of claim 9, further comprising:

querying a catalog of the database to identify table movement activity, including a list of moved tables; and identifying the table movement from the table movement activity, including identifying the moved table from the list of moved tables.

11. The method of claim 9, further comprising:

distinguishing the pre-move log records from the post-move log records by analyzing a log order value of each of the plurality of log records with respect to a movement time at which the table movement occurred.

12. The method of claim 9, further comprising:

obtaining, from a catalog of the database and in response to identifying the table movement, event data related to the source tablespace; and processing the updated pre-move log records and the post-move log records, using the event data to process the updated pre-move log records.

13. A system comprising:

at least one memory including instructions; and at least one processor that is operably coupled to the at least one memory and that is arranged and configured to execute instructions that, when executed, cause the at least one processor to:

query a database to retrieve a table movement of a moved table from a source tablespace to a target tablespace within the database, wherein the database has a database identifier (ID) and includes the source tablespace with a source tablespace ID and the target tablespace with a target tablespace ID;

query a log record repository of the database containing a plurality of log records, to thereby obtain from the plurality of log records, pre-move log records logged prior to the table movement and identifying the moved table as being included within the source tablespace, and post-move log records logged after the table movement and identifying the moved table as being included within the target tablespace;

store the pre-move log records and the post-move log records within a log record buffer to obtain stored pre-move log records and stored post-move log records;

identify the moved table within the stored pre-move log records using a combination of the database ID, the source tablespace ID, and a table ID of the moved table; and modify the stored pre-move log records within the log record buffer to obtain updated pre-move log records identifying the moved table as being included within the target tablespace, including changing the source tablespace ID to the target tablespace ID within the stored pre-move log records to thereby obtain the updated pre-move log records.

14. The system of claim 13, wherein the instructions are further configured to cause the at least one processor to:

query a catalog of the database to identify table movement activity, including a list of moved tables; and identify the table movement from the table movement activity, including identifying the moved table from the list of moved tables.

* * * * *